UNITED STATES PATENT OFFICE 2,655,454

WOOD TREATING PROCESS AND COMPOSITION

Eduard Farber and Matthew Sciascia, Washington, D. C., assignors to Timber Engineering Company, Washington, D. C., a corporation of Delaware No Drawing. Application February 12, 1952, Serial No. 271,278

43 Claims. (Cl. 117—147)

This invention relates to processes and compositions useful for the simultaneous dehydration and impregnation of wood. More particularly, the invention relates to the simultaneous dehydration and impregnation of wood with tar or creosote containing compositions.

It is conventional to treat green lumber articles, such as railroad ties, to simultaneously effect impregnation and reduce the moisture content thereof. Conventional methods for effecting dehydration and impregnation of lumber entail the immersion of the wood to be treated in a fluid impregnating medium such as a creosote or tar maintained at an elevated temperature to cause the water present in the wood to be distilled out and at least partially replaced by the impregnating medium. Modifications of this basic dehydration and impregnation process embrace the impregnation of the wood with a solvent which is miscible in both water and the ultimate impregnating medium, thereafter removing the water from the wood by distillation at reduced pressure, and finally displacing the solvent in the wood with the impregnating medium.

These prior art processes are largely unsatisfactory in that they result in physical degradation such as splitting, checking, and cracking of the wood treated. Many such processes are also economically infeasible or present technical problems which preclude commercial adaptation.

It is accordingly a primary object of this invention to provide compositions and processes which may be utilized to produce impregnated, at least partially dehydrated wood which does not demonstrate appreciable physical degradation.

It is a more specific object of the invention to provide processes and compositions for the treatment of wood which may be employed to simultaneously reduce the moisture content of and impregnate the wood without appreciable checking, cracking, and other seasoning defects.

It is another object of the invention to provide processes and compositions which may be utilized in the production, from green lumber, of railroad ties of superior quality.

The compositions of this invention consist essentially of a material selected from the group consisting of the water miscible polyhydric alcohols having from 2 to 6 hydroxyl groups, solutions of a boric acid in water miscible polyhydric alcohols having from 2 to 6 hydroxyl groups, solutions of an alkali metal borate in water miscible polyhydric alcohols having from 2 to 6 hydroxyl groups, boric acid esters of water miscible polyhydric alcohols having from 2 to 6 hydroxyl groups, and mixtures thereof contained in an impregnant selected from the group consisting of the tars and creosotes.

In accordance with the processes of the invention, wood is reduced in moisture content and impregnated by treatment with a composition of the invention maintained at a temperature above the boiling point of water under the conditions employed. It will be appreciated that both the impregnant and the polyhydric alcohol material contained therein should be liquid and have a boiling point higher than water under the conditions employed.

The polyhydric alcohols which may be employed in this invention embrace all those polyhydric alcohols having from 2 to 6 hydroxyl groups which are miscible with water and which have a boiling point higher than water under the conditions employed. The glycols including ethylene glycol, and the various isomeric propylene, hexylene, octylene, and other glycols can be employed. Similarly the trihydric alcohols such as glycerol can be utilized. In like manner alcohols having 4 hydroxyl groups such as erythritol and diglycerine can be used. Alcohols having 5 hydroxyl groups including the inner ethers of the hexitols, i. e. the hexitans, such as sorbitan and mannitan, can be employed. Additionally the hexitols including sorbitol and mannitol can be used. Mixtures of the various polyhydric alcohols such as a mixture of ethylene glycol and hexylene glycol, a mixture of ethylene glycol and sorbitol, and a mixture of glycerol and pentaerythritol can be employed and in some cases are preferred to impart increased compatibility with the impregnating medium. All polyhydric alcohols which have from 2 to 6 hydroxyl groups are embraced by this invention. Those polyhydric alcohols having from 2 to 6 carbon atoms are preferred.

The preferred polyhydric alcohols are glycols. When the polyhydric alcohols are used alone, that is in the absence of boric acids, borates, or boric acid esters, it is preferred that the polyhydric alcohols employed have not more than 3 hydroxyl groups. Such preferred polyhydric alcohols may be present in the impregnant in an amount equal to from about 15% to about 25% of the weight thereof.

All of the various boric acids and alkali metal borates may be employed in conjunction with the polyhydric alcohols in the compositions and processes of this invention. Orthoboric acid and sodium orthoborate are preferred. Meta- and tetraboric acid and sodium and potassium metaand tetraborates can be utilized. Additionally, all of the various hydrates of the alkali metal borates can be employed. Polyborates which embrace the salts of acids which may be represented by the formula $(B_2O_3)_n(H_2O)_m$ wherein $n$ is an integer from 1 to 6 and $m$ may be an integer from 0 to 3 can be used. Sodium and potassium peroxy borates such as $NaBO_3 \cdot 4H_2O$ can be used.

Likewise all of the various monomeric and polymeric boric acid esters of polyhydric alcohols having from 2 to 6 hydroxyl groups can be employed in the invention. Both partial and complete esters of all boric acids are contemplated. Glycol borates, including ethylene glycol orthoborates, hexylene glycol orthoborates, ethylene glycol pyroborates, propylene glycol metaborates, and the like can be employed. Glycerol and other trihydric alcohol borates can be utilized. Pentaerythritol, ortho, meta, and pyroborates are operable in the invention. Hexitol borates can be utilized.

It will be appreciated by those skilled in the art that many of the boric acids are polyboric and that these polyboric acids react with the polyhydric alcohols operable in the invention to form a large number of both monomeric and polymeric esters. All of these various monomeric and polymeric esters are operable in the invention which are soluble in or compatible with the coal tar or creosote impregnants employed.

The boric acids, boric acid esters, or borates are dispersed or dissolved in or reacted with the polyhydric alcohol utilized. In most instances, it is desirable to raise the temperature of the medium to expedite the formation of the desired compositions. Generally speaking, heating the mixture of boric acid or borate and a polyhydric alcohol to a temperature within the range of 50° C. to 90° C. is sufficient and is preferred. Substantially higher temperatures up to the charring temperature of the composition can be employed if desired. Temperatures of about 50° C. to about 200° C. are most practical. Those skilled in the art will appreciate that the heating of the mixture of a polyhydric alcohol and a boric acid or alkali metal borate may give rise to any one of a large number of reaction products, including monomeric and polymeric esters, resins, and the like. Any of the various compositions so produced can be utilized provided that the compositions are soluble in or compatible with the impregnant in which the material is dispersed. Reference is specifically made to U. S. Patent 2,084,261 for a description of the reactions which may occur between polyhydric alcohols and boric acid or borates when such mixtures are heated. All of the various esters, resins, and other reaction products of the type mentioned in U. S. Patent 2,084,261 which are soluble in the coal tar or creosote impregnant are embraced by this invention. Patent Number 2,084,261 indicates the general equivalency between alkali metal borates and boric acids when utilized in preparing the compositions of this invention.

Preferably when the boric acid, boric acid esters, or borates are utilized in conjunction with the polyhydric alcohols in this invention, the resulting polyol-borate or boric acid materials should contain from about 10% to about 40% by weight of boric acid, boric acid esters, or borate. A preferred range is from about 20% to about 30% by weight of boric acid, boric acid esters, or borates. A range of up to about 50% by weight of boric acid, boric acid esters, or borates is operable but in some instances sludge formation may be encountered in concentrations in excess of 30%. There is no minimum critical quantity of boric acid or borate concentration, however, a minimum of at least about 20% by weight of boric acid, boric acid esters, or borate is desirable. The function of the boric acid or borate is to increase and enhance the effectiveness of the compositions of the invention in achieving the dehydration and impregnation of wood without substantial surface degradation. It will be appreciated by those skilled in the art that the effect of the boric acid, boric acid ester, or borate will increase as the concentration thereof is increased at least up to the preferred range of 20% to 30% by weight of the polyhydric alcohol.

Generally speaking, the wood impregnating and dehydrating compositions of this invention may contain from about 2% to about 50% by weight of the polyhydric alcohol material employed. A preferred range is from about 10% to about 20% by weight of polyhydric alcohol when the alcohol is used alone. Utilization of an amount of polyhydric alcohol alone equal to less than about 10% by weight of the impregnant in the compositions of this invention may give less favorable results in the processes of the invention.

In that embodiment of the invention in which boric acid or alkali metal borate solutions in polyhydric alcohol or polyhydric alcohol esters of boric acids are employed, the compositions of the invention may appropriately contain substantially less of such material than the amount required when polyhydric alcohol is used alone. The preferred range of concentration of such solutions and esters is from about 3% to about 10% by weight of the tar or creosote impregnant. A practical lower limit of concentration is about 2% by weight of the tar or creosote impregnant.

All of the various creosotes and tars which are immiscible in water and which are characterized by a boiling point higher than that of water are embraced by this invention. Tars are normally obtained by distillation or other means from natural substances such as wood, peat, coal, shale, crude petroleum oil, and the like. Tars derived from all such sources are embraced by this invention. Pine tar, oak tar, and other wood tars, coal tar, rock tar, and other analogous materials can be employed. The materials known to the art as tar oils, treating oils, and the like are embraced by the expression tars and creosotes as employed in this invention. These materials can be used in the invention and are contemplated by the specification and claims.

Creosotes of all types can be used as impregnating media in the invention. Creosotes are normally obtained as distillates from tars and therefore are of the same origin as tars. Wood creosotes, creosotes of petroleum and coal tar origin, and the like can be employed in this invention.

The preferred impregnant comprises coal tar creosote having a boiling point range of from about 200° C. to about 400° C. The preferred creosote is desirably employed in conjunction or admixture with coal tar having a boiling point range of 200° C. to about 400° C. The coal tar preferably comprises from about 40% to about 60% by weight of such a mixture. In some instances it has proved desirable to extend the upper limit to a concentration of about 70% by weight of coal tar or coal tar oil in such mixtures.

The polyhydric alcohols, polyhydric alcohol solutions, and polyhydric alcohol esters which are employed in the production of the compositions of this invention may be incorporated into the tar or creosote impregnant by mechanical means known to the art. Conventionally these materials are incorporated by simple stirring or other mixing expedients.

In the wood dehydration and impregnation process of this invention, the compositions of the invention are preferably utilized within the temperature range of from about 105° C. to about 150° C. at atmospheric pressure. As the water is volatilized from the wood, impregnation is effected by the impregnating medium, i. e. the tar or creosote. In most instances satisfactory impregnation and dehydration of wood occurs in a period of from about 2 to about 8 hours. Preferably a period of 4 to about 8 hours is employed. Longer periods of treatment may be practiced when it is desired to remove greater quantities of moisture from and effect greater impregnation of the wood treated. All of the various types and species of wood can be treated with the compositions and processes of this invention. Either green lumber or wholly or partially dried lumber can be used. In the case of wholly dried lumber, of course, the primary function of the invention is to effect an impregnation. Typical woods include red oak, southern pine, red gum, and Douglas fir.

The following examples are illustrative of the practice of the invention:

Example 1

An ethylene glycol-orthoboric acid solution was prepared by mixing about 5 parts by weight of ethylene glycol with about 3 parts by weight of boric acid and heating the mixture to a temperature of 70° C. with agitation to produce a substantially homogeneous solution.

Approximately 5 parts of this ethylene glycol-boric acid solution were mixed with 100 parts of creosote of coal origin having a boiling point range of 205° C. to 360° C. A railroad crosstie blank cut from green timber was immersed in the impregnating medium containing the boric acid solution which was then heated to a temperature of about 125° C. and maintained at that temperature for a period of about 6 hours at atmospheric pressure. During the course of the treatment water volatilized from the wood, which in turn became partially impregnated with creosote. Examination of the crosstie upon removal from the treating medium failed to reveal an appreciable checking or cracking.

A small quantity of the glycol and boric acid medium is taken up by the wood. The amount of this solution which is so dissipated is far below that which would be required to replace the water which has been removed from the wood by distillation and is totally insufficient to impart any substantial degree of saturation to the wood fibers.

Example 2

A Douglas fir crosstie section measuring about 7 by 9 by 53 inches which contained about 65 parts of water per 100 parts of wood on a dry weight basis was placed in a treating cylinder equipped with appropriate connections to condensers and receiving vessels. A mixture containing 60 parts by weight of creosote and 40 parts by weight of coal tar was prepared. The creosote was of coal origin and had a boiling point range of about 205° C. to 360° C. The coal tar had a boiling point range of about 205° C. to 400° C. To 400 pounds of the creosote-coal tar mixture was added a solution of five pounds of ortho-boric acid in 16 pounds of ethylene glycol prepared in the manner described in Example 1. The creosote-coal tar impregnating medium containing the boric acid solution was introduced into the treating cylinder containing the tie section. The cylinder was then heated indirectly by steam and the temperature of the impregnating medium was raised to about 145° C. This heating was continued until about 16 pounds of water were expelled from the tie and collected. The small amount of impregnating medium which distilled out with the water was continuously removed and returned to the cylinder. The operation required about 16 hours from the time the heating was initiated.

The weight of the crosstie section prior to treatment was 89 pounds and after treatment was 78 pounds. The amount of impregnating material absorbed was 5 pounds, the difference between the water removed and the loss in weight of the crosstie.

The tie section was in substantially perfect physical shape after removal from the impregnating operation. If it is desired to impart the standard degree of impregnation, about 8 pounds per cubic foot, a brief period of treatment of the tie, e. g., one to three hours, under reduced pressure may be applied.

Example 3

Example 2 was repeated with the exception that in this instance a red oak tie section was employed. This tie section weighed 115 pounds prior to treatment and 102 pounds after treatment for a period of about 6 hours as a result of which 23.3 pounds of water were removed. It will be observed that an impregnation of the extent of about 5.5 pounds of impregnating medium per cubic foot was achieved. The tie, after treatment, was free of defects such as checks and splits.

Example 4

Example 2 was repeated with the exception that the process was carried out for a time sufficient to reduce the moisture content from the original value of 77 parts of water per 100 parts of dry wood to 40 parts of water per 100 parts of dry wood. The treated wood demonstrated no appreciable change in dimensions and was substantially free of physical degradation such as checking and splitting.

It will be appreciated that the various other polyhydric alcohols previously mentioned in here can be utilized equivalently with the sorbitol, glycol, and the like.

Example 5

In a treating cylinder similar to that described in Example 2, there was placed a red oak tie section of the same dimensions and containing about the same percent of water as the tie section employed in Example 2. Four hundred parts of an impregnating medium consisting of petroleum tar, having a principal boiling point range of about 225° C. to about 360° C. was then mixed with a solution of 2 parts of orthoboric acid in 6 parts of diglycerine. The tar-boric acid solution mixture was then introduced into the treating cylinder containing the tie section. The cylinder was heated and the impregnation process was then carried out in the same manner, and under the same conditions as described in Example 2. The process was continued about 16 hours from the time the heating was initiated. Results were similar to those described in Example 2. The treated tie section was substantially reduced in moisture content and was essentially free of checking or splitting.

*Example 6*

Example 5 was repeated with the exception that in this instance oak wood tar having a principal boiling point range of from about 200° C. to 260° C. was employed as the impregnating medium. Results analogous to those described in Example 5 were achieved.

*Example 7*

Example 1 is repeated with the exception that sodium orthoborate is substituted for the orthoboric acid in the preparation of the ethylene glycol solution. The sodium orthoborate was a hydrate and is employed in an amount sufficient to provide 3 parts by weight of the dry borate.

The use of sodium orthoborate results in the formation of more sludge in the dehydration and impregnation process than was encountered in Example 1 when orthoboric acid is used.

*Example 8*

The process of Example 3 is repeated with the exception that potassium metaborate is substituted for the boric acid utilized in Example 3. The use of potassium metaborate presents some problem with respect to sludge formation. However, an effective dehydration and impregnation of the wood is effected. Those skilled in the art will experience no difficulty in practicing the invention when utilizing alkali metal borates. The various alkali metal borates embraced by the invention are utilized in the same manner as the various boric acids.

*Example 9*

A red oak block kept in green condition by soaking in water and weighing about 1000 g. was utilized. This block was placed in a glass vessel connected to a condenser. Into the vessel were placed about 1500 g. of a creosote-coal tar mixture of the type described in Example 1, having dispersed therein about 150 g. each of hexylene glycol and ethylene glycol. The vessel was then heated for a period of about 2¾ hours. The initial temperature was about 116° C. and the final temperature was about 143° C. The treated block demonstrated no checking or other surface degradation and was partially impregnated by the creosote-tar mixture.

*Example 10*

The process of Example 9 was repeated with the exception that only 37.5 g. each of hexylene glycol and ethylene glycol were employed. The heating was carried out for only 1½ hours. The initial temperature was 112° C. and the final temperature was 138° C. The results were analogous to those described in Example 9.

*Example 11*

The process of Example 9 was repeated with the exception that propylene glycol was substituted for ethylene glycol. The heating time was 2½ hours. The initial temperature was 109° C. and the final temperature was 140° C. The results were analogous to those described in Example 9.

*Example 12*

The process of Example 11 was repeated with the exception that only 75 g. each of propylene glycol and hexylene glycol were utilized. The results were analogous to those described in Example 11.

*Example 13*

The process of Example 9 was repeated with the exception that glycerine was substituted for ethylene glycol. The heating period was 2 hours, the initial temperature 117° C., and the final temperature 160° C. The results were analogous to those described in Example 9. The treated wood block showed no appreciable surface degradation and demonstrated good penetration by the impregnant.

*Example 14*

The process of Example 9 was repeated with the exception that there was substituted for the ethylene glycol and hexylene glycol 150 g. of a mixture containing 100 g. diethylene glycol and 50 g. dipropylene glycol. The block was heated for about 2¼ hours, the initial temperature was 107° C. and the final temperature was 118° C. The results were analogous to those described in Example 9.

*Example 15*

The process of Example 9 was repeated with the exception that in this instance 300 g. of diethylene glycol were substituted for the hexylene glycol-ethylene glycol mixture used in Example 9. The results were analogous to those described in Example 9.

*Example 16*

Example 9 was repeated with the exception that 300 g. of hexylene glycol were employed and the wood treated for only 2 hours. The treated block was satisfactorily impregnated with the creosote-tar mixture and no serious surface degradation was demonstrated.

*Example 17*

Example 15 was repeated with the exception that ethylene glycol was substituted for hexylene glycol and the treatment was carried out for 2¾ hours. The results were analogous to those of Example 15.

This application is a continuation-in-part of application Serial No. 217,289, filed March 23, 1951, to Eduard Farber and Matthew Sciascia, now abandoned.

We claim:

1. A wood impregnating and dehydrating composition comprising an impregnant selected from the group consisting of the tars and creosotes and mixtures thereof; said impregnant containing a material selected from the group consisting of: (1) the water-miscible polyhydric alcohols having from 2 to 6 hydroxyl groups, said alcohols being present in said impregnant in an amount equal to at least about 5% of the weight thereof; (2) solutions containing from about 10% to about 40% by weight of an alkali metal borate in a water-miscible polyhydric alcohol containing from 2 to 6 hydroxyl groups, said borate-alcohol solutions being present in said impregnant in an amount equal to at least about 2% of the weight thereof; (3) solutions containing from about 10% to about 40% by weight of boric acid in a water-miscible polyhydric alcohol having from 2 to 6 hydroxyl groups, said boric acid-alcohol solutions being present in said impregnant in an amount equal to at least about 2% of the weight thereof; and (4) boric acid esters of water-miscible polyhydric alcohols having from 2 to 6 hydroxyl groups, said esters being present in said impregnant in an amount equal to at least about 2% of the weight thereof; said material and said impregnant having a boiling point higher than that of water.

2. The composition of claim 1 wherein the material contained in the impregnant is ethylene glycol.

3. The composition of claim 2 wherein the ethylene glycol is present in an amount equal to from about 10% to about 20% by weight of the impregnant.

4. The composition of claim 1 wherein the material contained in said impregnant is a solution of sodium orthoborate in a water-miscible polyhydric alcohol having from 2 to 6 hydroxyl groups.

5. The composition of claim 1 in which the material contained in the impregnant is a polyhydric alcohol containing not more than 3 hydroxyl groups.

6. The composition of claim 5 in which the polyhydric alcohol is a glycol.

7. The composition of claim 5 in which the polyhydric alcohol is present in an amount equal to from about 10% to about 20% by weight of the impregnant.

8. The composition of claim 1 in which the material contained in the impregnant is a solution of an alkali metal borate in a polyhydric alcohol having from 2 to 6 hydroxyl groups.

9. The composition of claim 8 in which the polyhydric alcohol solution of alkali metal borate is present in an amount equal to from about 3% to about 10% of the weight of the impregnant.

10. The composition of claim 1 in which the material contained in the impregnant is a polyhydric alcohol borate ester.

11. The composition of claim 1 in which the material contained in the impregnant is a solution of boric acid in a polyhydric alcohol.

12. The composition of claim 11 in which the solution contains at least about 20% by weight of boric acid.

13. The process which comprises reducing the moisture content of and impregnating wood with the wood impregnating and dehydrating composition of claim 1, at a temperature above the boiling point of water under the conditions employed.

14. The process of claim 13 in which the material present in the impregnant is a polyhydric alcohol having not more than 3 hydroxyl groups.

15. The process of claim 14 in which the polyhydric alcohol is a glycol.

16. The process of claim 14 in which the polyhydric alcohol is present in an amount equal to from about 15% to about 25% by weight of the impregnant.

17. The process of claim 14 in which the polyhydric alcohol is a mixture of ethylene glycol and hexylene glycol.

18. The process of claim 13 in which the material contained in the impregnant is a polyhydric alcohol solution of an alkali metal borate, said solution being present in an amount equal to from about 3% to about 10% of the weight of the impregnant.

19. The process of claim 13 in which the material contained in the impregnant is a polyhydric alcohol borate ester.

20. The process of claim 13 in which the material contained in the impregnant is a solution of boric acid in a polyhydric alcohol.

21. The process of claim 20 in which the solution contains at least about 20% by weight of boric acid.

22. The process of claim 21 in which the boric acid solution employed is a solution of boric acid in a glycol.

23. The process of claim 22 wherein the glycol is ethylene glycol.

24. The process of claim 20 in which the boric acid solution is employed in an amount equal to from about 3% to about 10% by weight of the impregnant.

25. The process of claim 13 in which the impregnant comprises a creosote.

26. The process of claim 13 in which the impregnant is a material of coal tar origin.

27. The process of claim 13 in which the impregnant is a mixture of creosote and tar.

28. The process of claim 20 in which the boric acid solution contains from about 30% to about 50% by weight of boric acid.

29. The composition of claim 1 in which the material contained in the impregnant is a mixture of ethylene glycol and hexylene glycol.

30. The composition of claim 29 in which the mixture of ethylene glycol and hexylene glycol is present in an amount equal to from about 10% to about 20% by weight of the impregnant.

31. The process which comprises reducing the moisture content of and impregnating wood with an impregnating medium maintained at a temperature above the boiling point of water under the conditions employed, said medium consisting essentially of a water-miscible polyhydric alcohol solution of a boric acid contained in an impregnant selected from the group consisting of the tars and creosotes and mixtures thereof, said impregnant and said alcohol being liquid and having a boiling point higher than water, under the conditions employed, said solution containing at least about 20% by weight of boric acid, said solution being present in the impregnating medium in an amount equal to at least about 2% by weight of the impregnant, said polyhydric alcohol having 2 to 6 hydroxy groups.

32. The process of claim 31 in which the boric acid solution employed is a solution of boric acid in a glycol.

33. The process of claim 31 in which the boric acid solution is employed in an amount equal to from about 3% to about 10% by weight of the impregnant.

34. The process of claim 31 in which the impregnant comprises a creosote.

35. The process of claim 31 in which the impregnant is a material of coal tar origin selected from the group consisting of the tars and creosotes and mixtures thereof.

36. The process of claim 31 in which the impregnant is a mixture of creosote and tar.

37. The process of claim 31 effected at a temperature of from about 105° C. to about 150° C. at atmospheric pressure.

38. The process of claim 31 effected at subatmospheric pressure.

39. The process of claim 31 in which the boric acid solution contains from about 30% to about 50% by weight of boric acid.

40. The process which comprises reducing the moisture content of and impregnating wood with an impregnating medium maintained at a temperature above the boiling point of water under the conditions employed, said medium consisting essentially of a solution of orthoboric acid in ethylene glycol contained in an impregnant selected from the group consisting of the tars and creosotes and mixtures thereof, said impregnant having a boiling point higher than that of water, under the conditions employed, said solution containing at least about 20% by weight of orthoboric acid, said solution being present in the impregnating medium in an amount equal to at least about 2% by weight of the impregnant.

41. The process of claim 40 wherein the impregnating material comprises a mixture of coal tar-creosote and coal tar.

42. The process of claim 40 wherein the mixture of coal tar-creosote and coal tar contains from 40% to 60% by weight of coal tar.

43. The wood impregnating medium employed in the process of claim 31.

EDUARD FARBER.
MATTHEW SCIASCIA.

References Cited in the file of this patent

UNITED STATES PATENTS

| Number | Name | Date |
| --- | --- | --- |
| 1,006,076 | Friedemann | Oct. 17, 1911 |
| 1,690,390 | Williams | Nov. 6, 1928 |
| 1,803,607 | Goetz | May 5, 1931 |
| 2,066,583 | Shipley | Jan. 5, 1937 |
| 2,435,219 | Hudson | Feb. 3, 1948 |